Feb. 17, 1931. J. O. ALMEN 1,792,795
HYDRAULIC VALVE GEAR
Filed Dec. 24, 1927 2 Sheets-Sheet 1
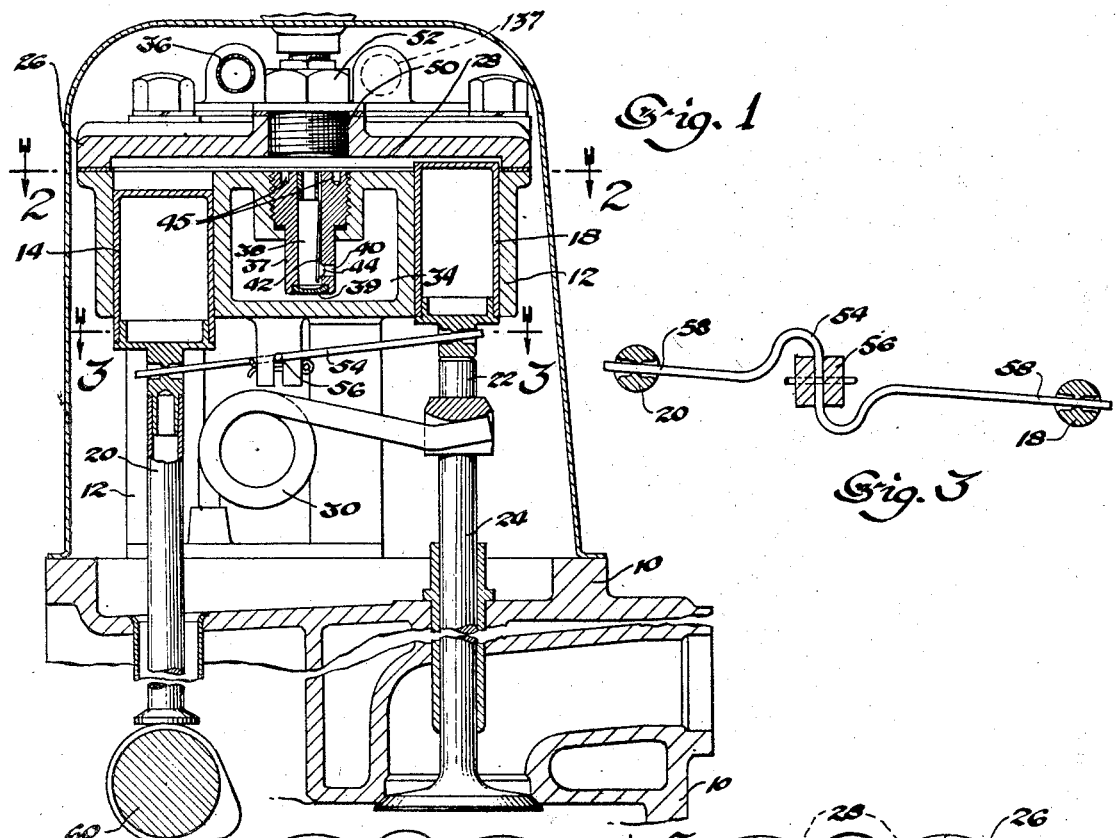
Fig. 1
Fig. 3
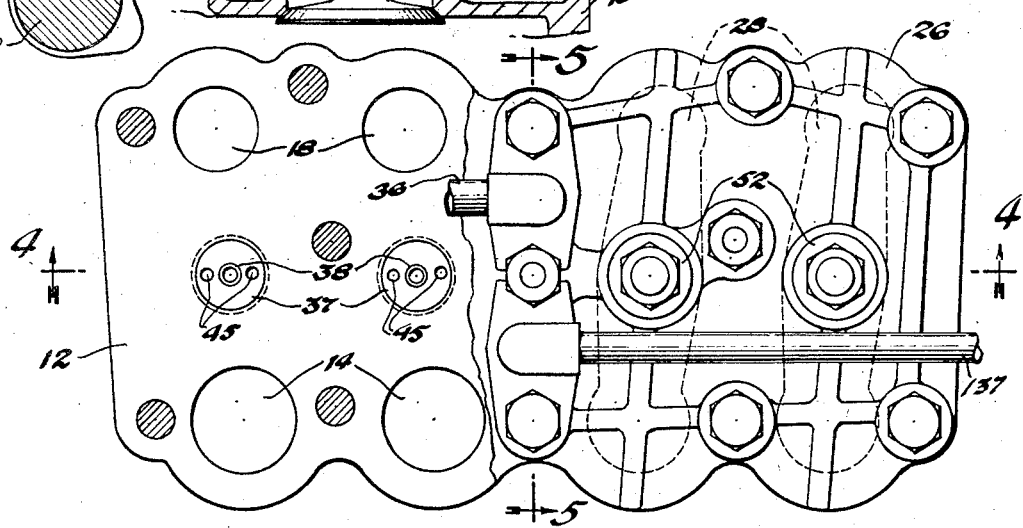
Fig. 2
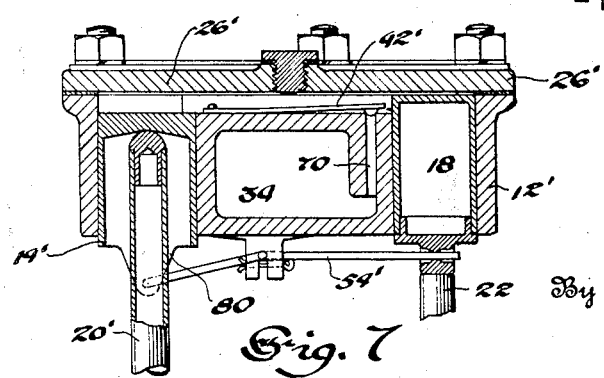
Fig. 7
Inventor
John O. Almen
By Blackmore, Spencer & Hindi
Attorneys

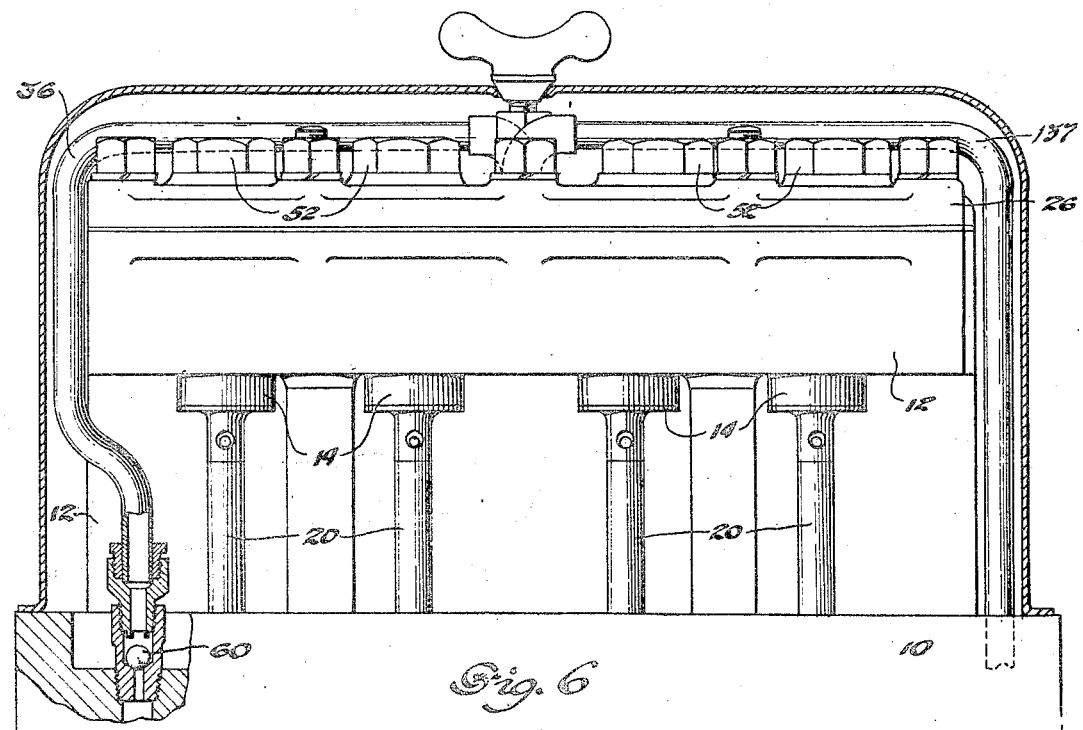
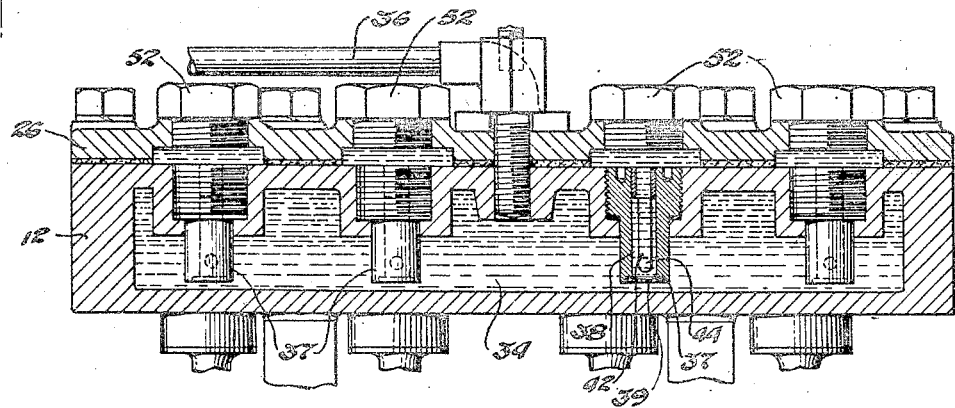

Patented Feb. 17, 1931

1,792,795

UNITED STATES PATENT OFFICE

JOHN O. ALMEN, OF ROYAL OAK, MICHIGAN, ASSIGNOR TO GENERAL MOTORS RESEARCH CORPORATION, OF DETROIT, MICHIGAN, A CORPORATION OF DELAWARE

HYDRAULIC VALVE GEAR

Application filed December 24, 1927. Serial No. 242,345.

This invention relates to hydraulic mechanism whereby motion is transmitted from an operating member to an operated member by displacement of fluid in a chamber. While the invention may be thus broadly classified, and is of use in various types of hydraulic mechanisms, it was developed in connection with the operation of valves of internal combustion engines and the description will be confined to that art.

In hydraulically operated valve gear heretofore developed, a difficult problem has been presented by the unavoidable accumulation of air in the hydraulic chamber, this air being alternately contracted and expanded under the operation of the operating member.

I have found that by employing an hydraulic chamber of proper size in proportion to the working displacement of the operating plunger the amount of air which may normally be entrapped in the chamber will not be sufficient to interfere with valve operation nor to render it noisy. The effect that the volume of the chamber has on the problem presented by the presence of air may be explained as follows: assume that the hydraulic chamber has a volume of 1000 cubic inches and the displacement produced by a full working stroke of the plunger is 10 cubic inches. Let it also be assumed that upon cooling of the engine the oil in the chamber contracts 6% in volume and a corresponding amount of air, 60 cubic inches, is drawn in. It will be apparent that when the engine is started up cold the operating plunger will do nothing more than contract and expand the 60 cubic inches of air with the result that the valves will not be opened. With this condition it will be impossible to start the engine.

In actual practice the ratios of volume of the hydraulic chamber to working displacement heretofore employed have not been as great as that taken as an example, the ordinary ratio being in the neighborhood of 13 to 1. Nor, except in extreme cases, will the percentage of contraction in volume be as high at 6%. Nevertheless, unless some special means is provided to remove air from the system the prior hydraulic valve mechanisms are noisy and at times fail to operate for the reasons above explained.

Let us assume another design in which the working displacement of the plunger is 10 cubic inches and the volume of the chamber is 40 cubic inches. Upon cooling of the engine the oil will contract 6% and an equal volume of air, 2.4 cubic inches, will be admitted. When the engine is now started up the air cushion will first be compressed but as it represents but 24% of the working displacement of the operating plunger, the valve will be opened to substantially its full amount. In other words, the quantity of air is so small that its effect on operation is negligible. Furthermore, with my design, as the engine gets under way and the oil becomes heated and expands, the air, usually in the form of an emulsion, finds exit at the sliding joints and is replaced by fresh oil so that after but a short period of operation, the valve is opened to its full extent. In practice I have found a ratio of volume of hydraulic chamber to piston displacement in the neighborhood of 2 to 1 to 4 to 1 to give very satisfactory results. In recent designs I have preferred a ratio of about 3½ to 1.

Thus by employing an hydraulic chamber of the proper size, and providing means to replenish the chamber, the initial presence of air in the chamber is of little consequence. There will never be enough to render the apparatus inoperative and the small amount that is present on starting will be replaced by oil after a few minutes operation, taking up all slack in the gear and giving the full benefits of hydraulic operation.

The design of valve gear disclosed in this application is likewise characterized by simplicity in construction rendering it easy to machine, assemble and repair. The hydraulic chamber is provided with a removable head as in automobile engine design. There is but a single valve employed in connection with each hydraulic chamber and that is preferably of the simplest possible type being in the form of a resilient strip of metal. To render the valve accessible for replacement or repair, it is preferably carried in a plug which may be easily and quickly removed through an aperture in the top of the chamber which is normally closed by means of a filling plug.

In the drawings:

Figure 1 is a vertical section through my improved operating gear.

Figure 2 is a plan view of the apparatus with the dust cover removed and a portion of the head of the hydraulic chamber broken away.

Figure 3 is a detail of the rocker spring taken substantially on line 3—3 of Figure 1.

Figure 4 is a section on line 4—4 of Figure 2.

Figure 5 is a section on line 5—5 of Figure 2.

Figure 6 is a side elevation of the upper portion of the engine. Figure 7 is a section similar to Figure 1 but showing a modification.

The engine illustrated is of the standard Buick design, modified to receive my improved valve gear.

10 indicates the engine block in which the usual cylinders are provided. To the block is bolted a casting 12 bored to receive the operating plunger 14 and operated plunger 18. The operating plunger 14 is actuated by, but preferably not, a part of the tubular push rod 20, while the lower end of the operated plunger 18 abuts against the stem 22 of the valve 24. To the upper end of the casting 12 is bolted the head 26 which is machined at spaced points to provide the hydraulic chambers 28. It will, of course, be understood that there is a separate chamber, with operating and operated plungers, for each of the valves. The valves may be provided with conventional coil springs but I have preferred to illustrate at 30 springs of the so-called "rat trap" type covered in the co-pending application of George E. A. Hallett, Serial No. 180,914, filed April 4, 1927. Between the bores in which the plungers are received, the casting 12 is provided with a reservoir 34 extending longitudinally of the engine and supplied with oil through conduit 36 which may be connected on the output side of the usual circulating pump of the engine lubricating system. The reservoir 34 communicates with the hydraulic chambers through individual fittings 37 in the form of plugs threaded into apertures in the casting 12 and having central bores 38 as shown. The lower end of the bore 38 closed by disk 39 and the bore communicates with the chamber 34 from passage 40. The passage 40 is normally closed by the valve 42 which is shown in the form of a narrow strip of spring steel having a pressed out seating portion 44. The upper surface of the plug is provided with sockets 45 to receive a special tool for unscrewing it.

In line with the hole in which the plug 37 is received the head 26 is provided with a threaded aperture 50 normally closed by means of a cap 52. By removing the cap access is obtained to the plug 37 so that it may be removed for repair or replacement.

I have shown at 54 a rocker spring fulcrumed at 56 having one end 58 engaged in an aperture in the upper end of the tappet 20 and the other end similarly engaged with the stem of the actuated piston 18. In the position shown, the spring 54 is under torsional stress so that it at all times exerts a downward pressure on the tappet and plunger holding the former against the cam and the latter against the valve. The pivot 56 is so located that the spring 54 is subject to no additional distortion during operation of the valves. This structure is explained in detail and claimed in the prior application of George E. A. Hallett, Serial No. 182,935, filed April 11, 1927.

My improved valve gear operates as follows:

Normally, the hydraulic chamber 28 is filled with oil. Upon rotation of the cam shaft 60, the tappet 20 is forced upwardly displacing the oil in the chamber 28 and causing downward movement of the actuated plunger 18, unseating the valve 24 against the opposition of its spring 30. The spring 54, as previously stated, at all times holds the tappet against the cam and the actuated piston against the valve. In doing this, any lost motion in the mechanical parts is taken up and the chamber 28 is held expanded to its maximum amount.

During the working stroke the oil in the chamber 28 is slightly compressed partly because of the presence of occluded gases and partly because the oil itself is compressible. The pressure in the chamber will force the valve 42 against its seat preventing the escape of oil into the reservoir 34.

As the high point of the cam passes from beneath the tappet and the tappet and plunger 14 are returned to their original positions by action of the rocker spring 54 and a conventional coil spring (not illustrated) provided on the tappet for the purpose. Spring 30 will return the valve 24 and the plunger 18 to their original positions. The rocker spring 54 will hold the plunger 18 against the stem of the valve 24 and the plunger 14 against the upper end of the push rod. When the valve lifter is again on the cam base circle, the spring 54 will thus hold the hydraulic chamber 28 expanded and in case any oil has leaked out, will create sufficient suction to draw oil in from the reservoir past the valve 42.

The reservoir 34, it will be recalled, is supplied with oil from the crankcase through the conduit 36. The oil in the reservoir may be under pressure or not, as preferred. I have shown a conduit 137 for the return of excess oil and entrapped air from the reservoir to the crankcase. Any air which finds access to the hydraulic chamber during normal operation will be forced out owing to the pumping action and the high pressure under which the fluid is placed by the operating plunger.

When the engine is stopped and cools down, the oil in the hydraulic chamber 28 will contract and air will find its way into the chamber through the joints and the spaces between the plungers and their cylinders. It has been found in practice that the amount of air admitted under such circumstances is rarely in excess of 6% of the volume of the chamber, but it has likewise been found to be practically impossible to prevent the entrance of air. The hydraulic chamber illustrated is of a volume equal to approximately 3½ times the displacement of the actuating piston.

When the engine is now started the first action of the plunger 14 will be to compress the air contained in the hydraulic chamber, but after this has been done the operated plunger will be forced down opening the valve 24 and permitting the starting of the engine. During the continued operation of the engine the air will be forced out of the chamber 28 through the action just described.

As it is desirable that there will at all times be oil in the chamber 34, I have provided a one way valve 60 in the conduit 36 which prevents the emptying of the chamber. It will be noted that the oil is taken from the reservoir 34 near the bottom while oil is fed to the reservoir and discharged from the reservoir from points at the top of the chamber, thus making it possible for any air to readily escape from the reservoir through conduit 137 preventing its admission to the hydraulic chambers.

As previously pointed out the oil used in this type mechanism is compressible to an appreciable degree, whether due to occluded gases or for other reasons. Obviously, before the actuated plunger is moved the oil must be compressed. With an hydraulic chamber of small volume the displacement represented by compression of the oil is very small compared with the working displacement. This means that the cams on the shaft 60 need be provided with smaller ramps than where large volume hydraulic chambers are used for the system contains less slack to be taken up before the valve is operated. This gives quieter operation.

The practical limit to the volume of the hydraulic chamber is determined by the permissible loss of velocity of the oil due to friction in travelling from the one plunger to the other. Obviously, if the chamber were made of capillary proportions, the speed of the oil in going from one plunger to the other would be very great and the friction would likewise be very high. The friction would cut down the velocity and greatly limit the speed of operation of the valves. Consequently, a compromise must be reached depending largely upon the required valve speed. Whatever be the actual volume for a given design of engine, the volume of the chamber must nevertheless be such that the air admitted on cooling of the engine is so small a proportion of the working displacement of the actuating piston as not to interfere with valve operation.

Note particularly the ease of machining of the parts constituting my gear. The casting 12 is of simple design. The bores for the piston may be made on well-known multiple drill machines. The head 26 may be easily planed and shaped to provide the hydraulic chambers. Note also that the plugs 37 are readily removable and that, indeed, the whole assembly may be taken from the engine block with ease.

In Figure 7 I have shown a modified form in which the plug 39 is omitted, the inlet valve being in the form of a spring 42' mounted directly on top of the reservoir 34 and controlling passage 70 leading to the bottom of the reservoir. To obtain access to the valve it is necessary to remove the head 26'. Instead of forming the hydraulic chambers in the head 26' they are in this case made in the base 12'. Note also that in this form the tappet 20' abuts against the underside of the piston 14' and the rocker spring 54' has one end engaged in an ear 80 formed on the lower end of the piston 14' instead of in the tappet.

I claim:

1. An hydraulic operating system comprising an hydraulic chamber, an operating member for displacing the fluid in the chamber, a member operated by displacement of the fluid, the volume of the hydraulic chamber being slight compared with the working displacement of the actuated plunger so that the maximum volume of air normally admitted to the chamber is insufficient to interfere with the operation of the system.

2. In hydraulic operating mechanism the combination of an hydraulic chamber, an operating plunger for displacing fluid in the chamber, an operated plunger, an engine valve operated by said plunger, the volume of the hydraulic chamber being slight compared with the working displacement of the operating plunger so that the extent of movement of the operating plunger required to compress the oil and the air which is admitted to the system is insufficient to produce noisy operation.

3. Hydraulic valve operating mechanism for engines comprising an hydraulic chamber, an operating plunger and an operated plunger working in the chamber, the ratio of the volume of the chamber to the working displacement of the operating plunger being within the range of 2 to 1 to 4 to 1.

4. Hydraulic valve operating mechanism comprising an hydraulic chamber, an operating plunger and an operated plunger working in the chamber, a push rod engaging the operating plunger, a camshaft for reciprocating the push rod, a valve actuated by the operated plunger, means for causing the plungers to at all times follow the push rod and valve respectively to produce pumping action within the chamber, a reservoir, a passage for admitting oil from the reservoir to the chamber in response to the pumping action, the volume of said hydraulic chamber being slight compared with the working displacement of the operating plunger so that the maximum volume of air normally admitted to the chamber is insufficient to interfere with operation of the system.

5. In the combination as defined in claim 4, a non-return valve in said passage.

In testimony whereof I affix my signature.

JOHN O. ALMEN.